Sept. 19, 1961     R. GAUGUIN ET AL     3,000,699
PURIFYING LITHIUM SALTS
Filed Oct. 13, 1958
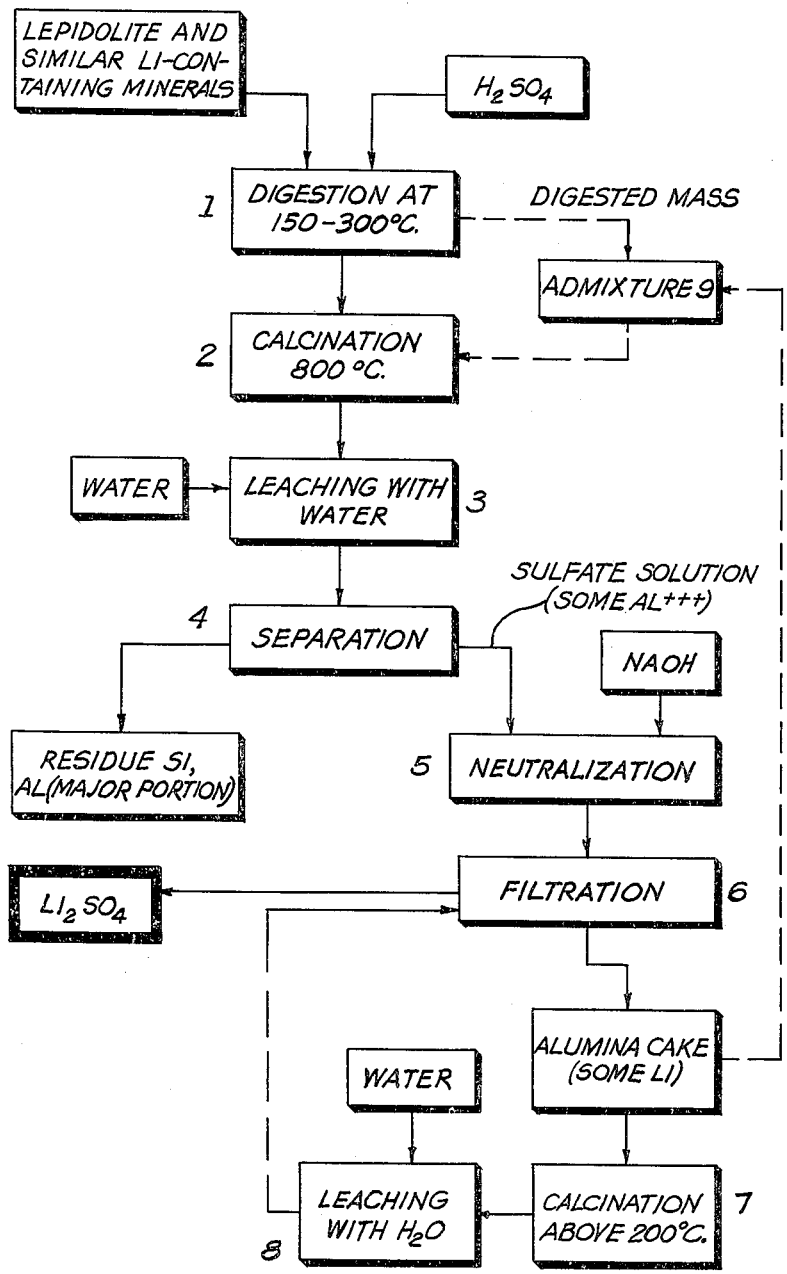
INVENTORS.
ROLAND GAUGUIN
JACQUES CLAUS
BY Toulmin & Toulmin
ATTORNEYS '# 3,000,699
PURIFYING LITHIUM SALTS
Roland Gauguin, Neuilly-sur-Seine, and Jacques Claus, Aubervilliers, France, assignors to Pechiney, Compagnie de Produits Chimiques et Electrometallurgiques, Paris, France
Filed Oct. 13, 1958, Ser. No. 766,940
Claims priority, application France Oct. 18, 1957
6 Claims. (Cl. 23—32)

This invention relates to the complete separation of aluminum and of lithium starting from an aqueous solution containing salts of these two metals.

The conventionally used process comprises the precipitation of $Al^{+++}$ in the form of alumina by neutralizing the solution to a pH between 4 and 12, or preferably 8 and 9, and then filtering it, only the lithium salt passes into the filtered solution.

However, the alumina precipitate retains a considerable amount of lithium salt which cannot be separated therefrom even through repeated washings. If the aqueous solution is rich in aluminum, this loss of lithium can be very important, for anaylses show that the washed precipitate corresponds approximately to the formula:

$$2Al_2O_3,Li_n(X),aH_2O$$

wherein X designates an anion of valence $n$.

It is therefore an object of the present invention to recover the partition of lithium occluded by, or adsorbed on alumina as described hereinbefore at the time of precipitating the latter. This object is obtained by the process according to our invention which comprises (I) neutralizing the solution containing lithium and aluminum salts, usually in the form of their sulfates, so as to cause the precipitation of aluminum hydroxide, (II) separating the precipitate from the solution by filtration or a similar step, heating the resulting hydroxide cake above 200° C. and washing the cake with water thereby extracting from the cake the total content of lithium salt originally occluded in, or adsorbed on the aluminum hydroxide precipitate.

In the last mentioned step of aqueous extraction of the solubilized lithium salt from the cake calcined at above 200° C., it is not necessary to use large amounts of water.

The maximum concentration of the lithium solution obtained by the extraction step is limited only by the saturation of the salt under the conditions in which the operation is carried out. Thus, in the particular case of lithium sulfate, the extracted solution may contain more than 20 g. of lithium per liter.

According to another feature of the invention, the neutralization of the solution is effected through the addition of a hydroxide or carbonate of an alkali metal or alkaline-earth metal. The pH value of the mother liquor containing the aluminum hydroxide should be between 4 and 12 and preferably between 8 and 9.

It is an advantage of the process according to the invention that the lithium salt contained in the alumina is extracted, after calcination, in the form of a concentrated solution.

The separating method according to our invention is particularly useful, when applied in the treatment of aluminum-containing lithium ores such as lepidolite and the like. Generally, in the course of such treatment, aqueous solutions are obtained, which comprise salts of both aluminum and lithium simultaneously.

When the solution of aluminum and lithium salt is obtained from an aluminum containing lithium ore the treatment of which comprises a calcination followed by a water washing, the calcination and washing of the precipitated aluminum hydroxide are not made separately, but, according to a preferred mode of operating the process according to our invention the aluminum hydroxide is added to the mass of ore treated with an acid in a subsequent work cycle, in such a manner that the total mass of the ore and the precipitated hydroxide are simultaneously subjected to these treatments.

The treating of the mixture of precipitated aluminum hydroxide with a lithium containing ore and an acid, for solubilizing the lithium content of the ore, such as sulfuric acid, is carried out at a temperature between about 200° C. and 900° C., and preferably by gradually raising the temperature to about 800° C.

The application of the process according to the invention to the particular case of the treatment of lepidolite with concentrated sulfuric acid in the production of soluble lithium compounds shall now be explained in detail with the aid of the accompanying flow-sheet.

After a digestion (1) with sulfuric acid at a temperature between 150 and 300° C., the digested mass is calcined (2) at about 800° C.; silicon and aluminum are obtained in the form of a water-insoluble product, while the lithium contained in the mineral is converted to litthium sulfate, which is soluble in water. The calcined product is digested (3) with water and the slurry separated (4), for instance, by filtration or a similar step into a residue containing silica and the major portion of alumina and an aqueous solution of lithium sulfate.

In practice, however, some aluminum always remains in water-soluble form and passes into the latter solution, wherefore it must be eliminated from the solution by precipitation (5) and filtration (6). The amount of lithium retained by the precipitated alumina generally amounts to between 20 and 30% of its total content in the treated ore; this constitutes a serious loss in the yield of the entire process.

According to the process of the invention, the totality of the lithium can be recovered from the aluminum precipitate in the form of a concentrated solution by heating (7) the precipitate cake to above 200° C. and by then treating the calcined mass (8) with water. Thereby, the amount of lithium extracted from the ore is increased by 25 to 40%.

The costs in apparatus and manpower required for carrying out the operational steps comprising the calcination and additional extraction as described above can be greatly reduced or avoided by the preferred mode of operation of the process according to our invention. This preferred mode comprises the additional steps, also illustrated in the flow-sheet.

In accordance with this preferred mode of operation the lithium salts-containing alumina precipitate is not calcined and washed separately, but is simply admixed (9), in the course of a further operation, to the mass obtained from the digestion with sulfuric acid; the resulting mixture is then subjected to calcination (2) and leaching (3) in the same manner as the digested mass alone, in the mode of operation first described. As the amount of precipitated alumina is far smaller than that of the digested ore attacked, the admixture does practically not require changes in the usual operating conditions of the conventional process; but, when after several, for instance two, three or four successive operation cycles, normal working conditions are attained, there are found, in the final extraction liquid 80 to 95% of the lithium contained in the ore, instead of 60 to 75% obtainable by the conventional process.

The invention will be further illustrated by a number of examples which are, however, not to be considered as limitative of the scope of the invention, the latter being, in fact, applicable to the treatment of all aluminum-containing lithium ores.

EXAMPLE I

To one liter of an aqueous solution of aluminum sulfate and lithium sulfate containing 16 grams per liter of aluminum and 13 grams per liter of lithium, there is added a 3 N sodium hydroxide solution until a pH of 8.5 is reached. The resulting precipitate is filtered off, washed with 200 cm.³ water, and then calcined at different temperatures as indicated in Table I below. The calcined alumina is leached in each case with 100 cm.³ water, and the results compiled in Table I are obtained:

*Table I*

| Example No. | Calcination temperature | (a) Fraction of Li in the filtrate after precipitation and washing of Al(OH)₃, by weight | (b) Fraction of Li in the washing of calcined Al₂O₃, by weight | (a)+(b), by weight |
|---|---|---|---|---|
| I | 300 | 0.83 | 0.16 | 0.99 |
| II | 400 | 0.84 | 0.15 | 0.99 |
| III | 600 | 0.80 | 0.16 | 0.96 |
| IV | 900 | 0.78 | 0.19 | 0.97 |

As will be easily seen from the above table the precipitate of alumina retains between 15 and 20% of the initially introduced lithium, which amount is totally recovered by the process of the invention.

EXAMPLE II 10 kg. of enriched lepidolite are ground so as to pass through a 200 mesh sieve and then mixed with 7 kg. of sulfuric acid of 66° Bé. The mixture is heated for 2 hours at 250° C., and then calcined at 800° for 2 hours and 30 minutes. After grinding, the burnt material is treated with water. The first extracted portions of a very concentrated solution are recovered separately from the subsequent portions; they contain about 69° of the total lithium of the ore and a proportion of aluminum such that the ponderal ratio $$\frac{Al}{Li}$$

equals 0.6. The subsequent washings are weaker and have as a total content 19% of the initially introduced lithium; they are recovered separately in order to be admixed to the water used for a later leaching operation. Thus, a portion amounting to 88% of the total lithium content of the ore is solubilized. The aforesaid concentrated solution is treated in the heat, preferably at 100° C. with 500 g. of calcium carbonate, which treatment results in the precipitation of aluminum in the form of its hydroxide. Filtration leads to a residue R on the filter, and to a filtered solution of lithium sulfate free from alumina but containing only 58% of the total lithium content of the ore. This means that the precipitate has retained about 11% of the total lithium content.

A second operation is effected in a similar manner, but the residue R from the first operation is added in a subsequent operation, to the material treated with the acid at 250° C., before the latter is calcined at 800° C. On the other hand the leaching of the calcined and ground material is started with the weak washing liquid resulting from the first operation.

After a few successive operations conducted in this manner, practically stable normal working conditions are reached; now, in each operation there is recovered a concentrated solution of lithium salts, free from alumina, and containing about 87% of the total lithium content initially present in the ore, i.e. practically the total amount of solubilized lithium.

It will be understood that this invention is susceptible to further modification and, accordingly, it is desired to comprehend such modification within this invention as may fall within the scope of the appended claims.

What we claim is:

1. A process for the separation of lithium salt from an acidic aqueous solution containing together soluble lithium and aluminum salts, comprising the steps of (a) neutralizing the solution sufficiently so as to cause the precipitation of aluminum hydroxide, (b) separating said hydroxide from the solution, (c) heating said aluminum hydroxide above 200° C. and then (d) leaching the heated aluminum hydroxide with water to extract the lithium salt contained therein.

2. A process according to claim 1, therein the said neutralizing is carried out so that the pH of the solution is adjusted to between 4 and 12.

3. A process according to claim 1, wherein the said neutralizing is carried out so that the pH of the solution is adjusted to between 8 and 9.

4. In a process for the production of lithium sulfate from lepidolite ore by (a) digestion of the ore with sulfuric acid, (b) calcination at temperatures about 800° C., (c) leaching with water, (d) precipitation of aluminum hydroxide occluding a portion of the lithium content from the aqueous solution by adjusting the pH of the latter to between 4 and 12, and (e) (separation of the aluminum hydroxide precipitate from the solution containing the major portion of the lithium content of the lepidolite; the steps of admixing the separated aluminum hydroxide precipitate to a new charge of lithium-containing ore digested with said acid, heating the resulting mixture to a temperature between 200° and 900° C., and repeating the aforesaid steps (c) to (e) inclusive, thereby obtaining an aqueous lithium salt solution containing practically the total amount of solubilized lithium from said ore.

5. The process of claim 1, wherein neutralization step (a) is conducted with a neutralizing agent selected from the group consisting of alkali metal hydroxides, alkali metal carbonates, alkaline earth metal hydroxides, alkaline earth metal carbonates.

6. The process of claim 4, therein the precipitation of aluminum hydroxide in step (d) is accomplished with a neutralizing agent selected from the group consisting of alkali metal hydroxides, alkali metal carbonates, alkaline earth metal hydroxides, and alkaline earth metal carbonates.

References Cited in the file of this patent

UNITED STATES PATENTS

| 2,021,987 | Colton | Nov. 26, 1935 |
| 2,021,988 | Carson et al. | Nov. 26, 1935 |
| 2,040,573 | Siegens et al. | May 12, 1936 |

FOREIGN PATENTS

| 6,626 | Great Britain | 1907 |

OTHER REFERENCES

Hader et al: "Industrial and Engineering Chemistry," vol. 43, No. 12, December 1951, pp. 2636–2646.